United States Patent [19]

Badeau

[11] Patent Number: 5,133,598
[45] Date of Patent: Jul. 28, 1992

[54] COMMAND SERVO FOR MOVING MIRROR OF MICHELSON INTERFEROMETER

[75] Inventor: Robert R. Badeau, Stoughton, Wis.

[73] Assignee: Nicolet Instrument Corporation, Madison, Wis.

[21] Appl. No.: 761,316

[22] Filed: Sep. 17, 1991

Related U.S. Application Data

[63] Continuation of Ser. No. 487,625, Mar. 2, 1990, abandoned.

[51] Int. Cl.$^5$ .............................................. G01B 9/02
[52] U.S. Cl. .................................. 356/345; 356/346; 356/72
[58] Field of Search ................. 356/346, 345; 318/640

[56] References Cited

U.S. PATENT DOCUMENTS

| | | |
|---|---|---|
| 3,409,375 | 11/1968 | Hubbard . |
| 4,053,231 | 10/1977 | Fletcher et al. . |
| 4,132,940 | 1/1979 | Schindler ............... 318/640 |
| 4,193,693 | 3/1980 | Schindler ............... 356/346 |
| 4,413,908 | 11/1983 | Abrams et al. .......... 356/346 |
| 4,575,246 | 3/1986 | Nishizawa et al. ...... 356/346 |
| 4,655,587 | 4/1987 | Wijntjes ................ 356/346 |
| 4,711,573 | 12/1987 | Wijntjes et al. ......... 356/346 |
| 4,799,001 | 1/1989 | Burch .................... 356/346 |
| 4,847,878 | 7/1989 | Badeau ................... 356/346 |

FOREIGN PATENT DOCUMENTS

| | | |
|---|---|---|
| 6165122 | 3/1986 | Japan . |
| SU524074 | 11/1976 | U.S.S.R. . |
| SU789688 | 2/1979 | U.S.S.R. . |

Primary Examiner—Vincent P. McGraw
Assistant Examiner—Richard Kurtz
Attorney, Agent, or Firm—Foley & Lardner

[57] ABSTRACT

The velocity of a moving mirror in a Fourier-transform infrared spectrometer is controlled by a circuit which utilizes a preset counter to generate pulses with a preset duration which are initiated at the zero-crossings of the signal from a detector of a laser light beam passed through the interferometer. This pulse signal is averaged and summed with a bias voltage and integrated and amplified to produce a drive current which is supplied to a drive coil which drives the moving mirror. When the mirror is moving too slowly, such that the preset duration pulses become a smaller fraction of the total time between zero crossings, the integrator provides an increased driving current and hence an increase in the speed of the mirror. If the mirror is moving too rapdily, the preset duration of the counter pulses will become a larger fraction of the time between zero crossings with a resultant reduction in the driving current and hence the velocity of the moving mirror.

7 Claims, 2 Drawing Sheets

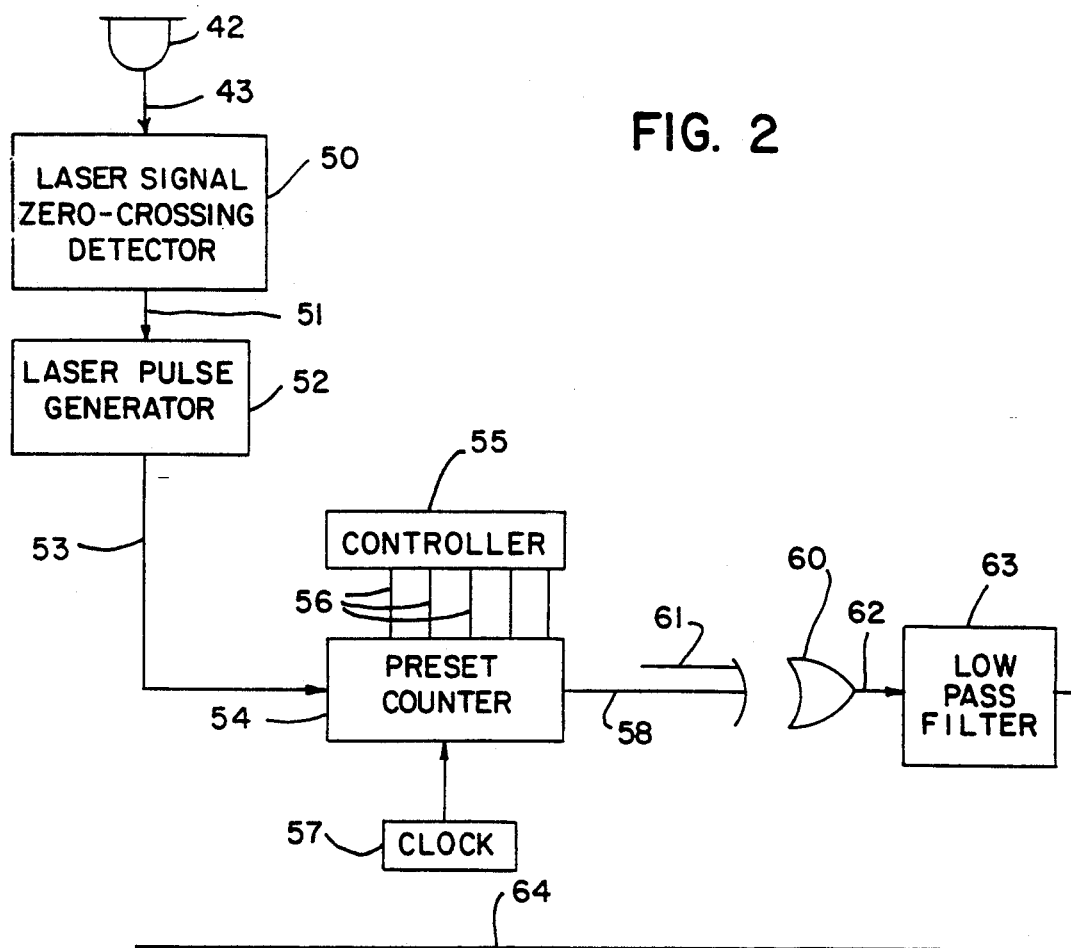
FIG. 2
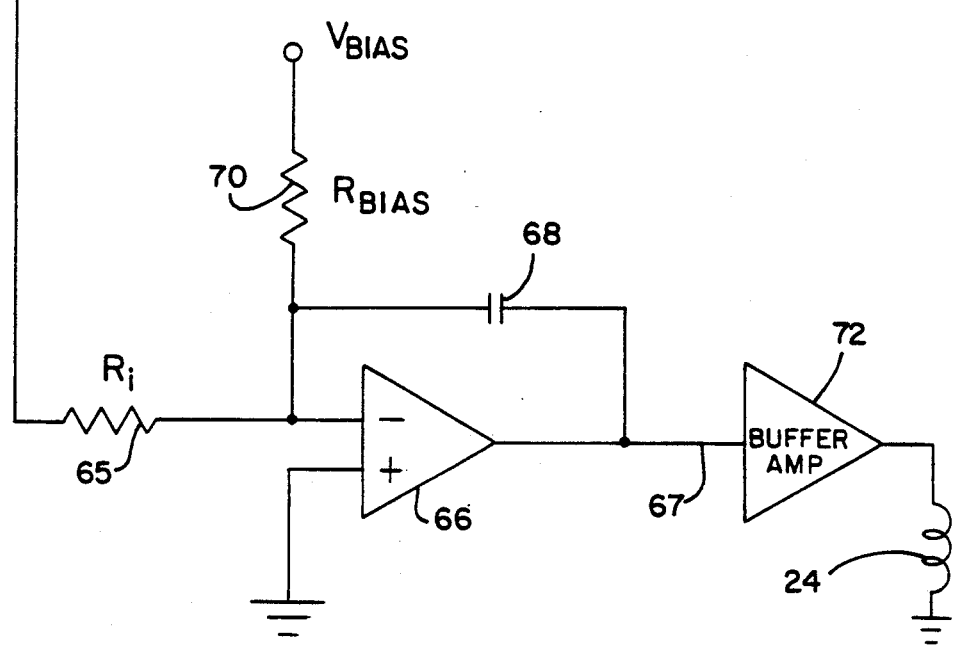

COMMAND SERVO FOR MOVING MIRROR OF MICHELSON INTERFEROMETER

This is a continuation of application Ser. No. 07/487,625 filed Mar. 2, 1990, abandoned.

FIELD OF THE INVENTION

The present invention relates generally to the field of Fourier-transform infrared (FTIR) spectrometers and particularly to control of the moving mirror of an FTIR optical system.

BACKGROUND OF THE INVENTION

The field of infrared spectroscopy has developed to provide devices for the prompt and efficient identification of chemical substances. Many of the Fourier-transform infrared (FTIR) spectrometer systems in commercial and laboratory use today make use of a Michelson interferometer to create a time varying light wave which is to passed through a sample of material. Variations in the light intensity due to interference are created by a moving mirror in the interferometer. Motion of the interferometer moving mirror is normally tracked by a positioning laser operating in parallel with the light source of the spectrometer, with the laser also entering the interferometer. The laser acts as a monochromatic light source so that the laser light intensity changes due to interference in the interferometer gives precise positioning information as to the change in position of the moving mirror.

The operation of such a Michelson interferometer FTIR spectrometer system is thus critically dependent on the position, speed, and control of the moving mirror. Since the motion of the mirror is desired to be constant, and since the mirror must stop and change direction, it is normal to detect the position of the mirror during its accelerating and constant velocity phases, so that precise information as to the location of the mirror can be utilized by the control circuitry of the FTIR. Such information is necessary to determine when to sample and digitize data. Exemplary systems for determining the start of scan and for determining the mirror position in an FTIR spectrometer are shown in U.S. Pat. Nos. 4,799,001 and 4,847,878 respectively, the disclosures of which are incorporated herein by reference.

SUMMARY OF THE INVENTION

In accordance with the present invention, the laser output of a Michelson moving mirror interferometer in an FTIR spectrometer system is detected and input to a zero-crossing detector which generates a square-wave signal the amplitude of which changes at each zero-crossing and which is used to generate a trigger pulse. The trigger pulse triggers a preset counter which produces an output signal which goes high when the trigger pulse is received and which goes low after counting a preset number of clock pulses. The output signal from the counter is provided to one input of an exclusive OR gate with the other input receiving a signal which dictates the direction of motion of the moving mirror. The exclusive OR gate output signal is provided to a low pass filter and thence to an integrating circuit which sums a bias voltage and the low pass filter output signal and integrates the sum. The output is provided to a buffer or driver amplifier which provides an output current of the proper polarity based on desired direction of motion of the mirror. The output current from the buffer amplifier is supplied to a linear motor drive coil to accelerate or decelerate the moving mirror.

The value of the bias voltage to the integrator is set so that during operation the output from the counter is high for about half of the time between laser pulse signals, resulting in the output voltage from the buffer amplifier remaining at a substantially constant DC level corresponding to a substantially constant current flowing through the drive coil to provide a substantially constant velocity for the moving mirror. If the mirror is moving too slowly, the period of the laser signal will lengthen from its nominal period, with the result that the pulses output from the preset counter will be high for less than 50 percent of the duty cycle. Thus, the average or DC level pulse signal presented to the integrating circuit will not be sufficient to offset the bias signal, and the output voltage from the integrator will increase. This will cause the mirror to accelerate until it reaches a desired velocity. Likewise, if the mirror is moving too slowly, the period of the signal from the preset counter will be too short and the pulses will be high for more than half of the period, with the result that the amplifier voltage will decrease, decreasing the current to the drive coil and deaccelerating the moving mirror.

The velocity of the moving mirror is easily changed by changing the preset count in the counter under the control of a microprocessor or by adjusting the clock rate.

Further objects, features, and advantages of the invention will be apparent from the following detailed description when taken in conjunction with the accompanying drawings.

BRIEF DESCRIPTION OF THE DRAWINGS

In the drawings:

FIG. 2 is a schematic circuit diagram of the servo system for controlling the moving mirror of an FTIR spectrometer of the present invention.

DETAILED DESCRIPTION OF THE INVENTION

Figure 1:
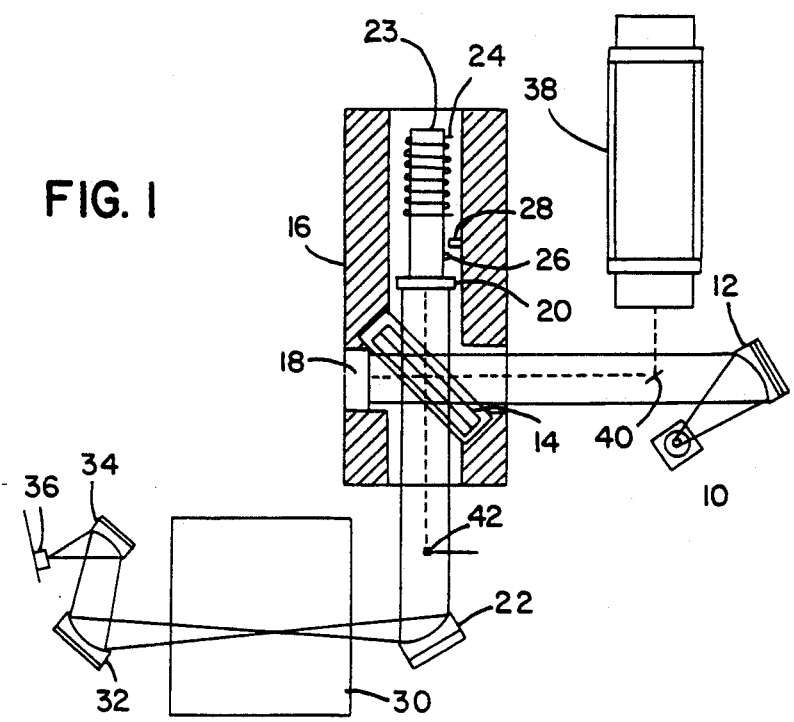
FIG. 1 is a simplified schematic view of the optical path of an FTIR spectrometer of the type which may be utilized in accordance with the present invention.

FIG. 1 illustrates the optical layout of a typical FTIR spectrometer system utilizing a Michelson interferometer. The system is illustrated in schematic form. It is to be understood that such interferometer systems can be laid out in many geometries and that the schematic illustration of FIG. 1 is intended to be exemplary of one of many such geometries which are possible.

An infrared light source is indicated at 10. The light emanating from the light source 10 is reflected off of a collimating mirror 12 which directs the light in a beam toward a beam splitter 14, located in an interferometer housing 16. The light from the mirror 12 which passes through the beam splitter 14 is then reflected by a reflecting mirror 18 located in the optical path of the beam coming from the mirror 12. Perpendicular to the light path beween the mirrors 12 and 18 is a light path created by recombining light from the first beam with light partially reflected by the beam splitter 14. This path extends between a moving mirror 20 and a focusing mirror 22. The moving mirror 20 moves toward and away from the beam splitter 14, or vertically as viewed in the schematic view of FIG. 1. This motion is accomplished by mounting the moving mirror 20 on a shaft 23 rearwardly by a drive coil 24. Mounted on the shaft 22 is a projection or tab 26 which is arranged so as to pass through a light beam extending between a light source (not shown) and a photodetector 28 as the shaft 22 moves linearly in the housing 16 so as to interrupt the light flow to the photodetector 28 when the tab 26 is adjacent thereto.

Light leaving the interferometer housing 16 is reflected by the focusing mirror 22 through a sample chamber 30 from where it goes to focusing mirrors 32 and 34 in which it is focused on a detector 36. Motion of the moving mirror 20 thus makes a time dependent light signal in the sample chamber 30, the variations in which may be detected by the detector 36. This information can be analyzed by appropriate Fourier analysis to indicate the spectral characteristics of the substance contained in the sample chamber 30.

For appropriate and accurate frequency domain information to be generated by the FTIR spectrometer system, the direction of motion, the speed of motion, and the position of the moving mirror 20 must be controlled at all times. For this purpose, a laser interferometer system is used to precisely indicate motion and position of the moving mirror 20. This system consists of a laser 38, the output of which is directed off of a reflecting mirror or partially reflective beam splitter 40 into the center of the light path of the interferometer housing 16. The laser beam, indicated in dashed lines in FIG. 1, is also split by the beam splitter 14, creating a beam, the intensity of which varies sinusoidally as a result of interference in the interferometer, which is directed toward the mirror 22. The mirrors 12 and 22 may be contructed so that the laser light passes there through or passes adjacent to the mirrors. The laser interferometer output is detected by a detector 42 located in the beam path ahead of the mirror 22. Thus, as the mirror 20 moves, the interference pattern of the split beam laser light creates a variable intensity light beam, varying in a sine function, detected at the detector 42, with each cycle representing a fixed increment of linear distance of movement of the moving mirror. This sinusoidally varying light received at the detector 42 is digitized by a zero-crossing detection circuit (not shown in FIG. 1) which generates a pulsed output, as discussed below.

Figure 3:
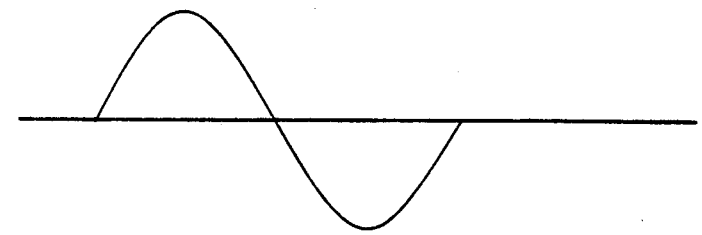
FIG. 3 is a representation of the signal from the laser detector in the system of FIG. 2.
Figure 4:
FIG. 4 is a representation of the signal from the zero-crossing detector in the system of FIG. 2.

With reference to FIG. 2, the output of the detector 42 on a line 43 is a time varying, substantially sinusoidal electrical signal (as shown in FIG. 3) which is provided to a zero-crossing detector circuit 50. The zero-crossing circuit 50 is of standard and well known design, and puts out a rectangular wave pulse on a line 51, substantially as shown in FIG. 4, which changes level at the zero-crossings of the signal from the detector 42. The output of the zero-crossing circuit 50 on a line 51 is provided to a laser pulse generator 52, essentially functioning as a monostable circuit triggering at the rising and falling edges of the pulse of FIG. 4, to provide an output pulse signal on a line 53 of the type shown in FIG. 5. The signal on the line 53 is then provided to a preset counter 54 which receives a preset count from a microprocessor or other controller 55 on input lines 56, and which also receives clock signals from an oscillator 57 (e.g., at 20 MHz). The counter 54 (e.g., two HC592 counters connected so that the overflow of the first acts as the clock pulse for the second) provides an output signal on its output line 58 which goes high at the time of each laser pulse and remains high until the count in the counter reaches the preset number, at which time the count goes low, resulting in a precisely timed series of pulses on the line 58, as shown in FIG. 6, that start at the time of each laser pulse.

Figure 7:
FIG. 7 is a representation of the output of the low pass filter in the system of FIG. 2.

The signal on the line 58 is provided to one input of an exclusive OR gate 60 which receives at its other input, on a line 61, a signal which dictates the direction of motion of the moving mirror (e.g., a "high" signal when the mirror is moving in one direction and a "low" signal when the mirror is moving in the other direction). The output of the exclusive OR gate on a line 62 is provided to a low pass filter 63 or averager to provide an output that is approximately the average value of the signal at line 62, as shown in FIG. 7, and the output of the filter on a line 64 is provided through an input resistor 65 to the inverting input of an operational amplifier 66. The low pass filter may be implemented in any desired manner, for example, using an operational amplifier with parallel feedback resistor and capacitor and an input resistor, with time constants chosen to substantially average the magnitude of the pulses. The output of the amplifier 66 on a line 67 is fed back through an integrating capacitor 68 to its inverting input. The operational amplifier 66 is also connected to receive a constant bias current provided from a bias voltage $V_{bias}$ through a resistor 70 which is connected to the inverting input of the amplifier. The output of the amplifier 66 on a line 67 is then provided to a buffer or driver amplifier 72 which will provide an output current of the proper polarity based on the required direction of motion of the mirror. The output current from the buffer amplifier is provided to the voice coil 24 to drive the motion of the moving mirror.

Figure 5:
FIG. 5 is a representation of the signal from the laser pulse generator in the system of FIG. 2.
Figure 6:
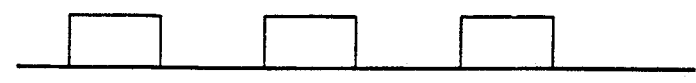
FIG. 6 is a representation of the signal from the preset counter in the system of FIG. 2.

The value of $V_{bias}/R_{bias}$, the bias input current or set point to the amplifier, is adjusted (for example, by using a variable resistor as the resistor 70 and adjusting it to the proper resistance) so that during operation when the mirror is moving the signal on the line 58 is high for about half of the time between laser pulse signals (the pulses on the line 53 as shown in FIG. 5). At this relative ratio the duty cycle for the signal on the line 58, which is passed through to the input of the amplifier 66 after passing through the low pass filter 63, results in the output voltage from the amplifier 66 remaining at a substantially constant DC level, corresponding to a substantially constant current flowing through the drive coil 24, and thus a substantially constant velocity for the moving mirror.

If, during operation, the mirror slows down so that it is moving too slowly, the period of the signal on the line 51 from the zero-crossing detector 50 shown in FIG. 4 will lengthen from its nominal period. However, although the signal on line 58 from counter 54 will continue to produce the precisely timed pulses, the pulses will be high for less than 50% of the duty cycle. As a result, the signal passed through the low pass filter 63 to the summing junction at the input of the operational amplifier 66 will not be sufficient to completely cancel the integration being performed by the amplifier 66 on the bias signal, and the output voltage from the amplifier 66 will increase. This will cause the current from the buffer amplifier provided to the coil 24 to increase, thereby accelerating the moving mirror 20 until the moving mirror 20 reaches the desired velocity—at which point the period of the pulses on the line 58 from the counter will be high for about half of the period of the pulse laser signal.

Conversely, if the velocity of the moving mirror decreases below its nominal velocity, the period of the signal from the zero-crossing detector 50 will be too short, and the pulses provided from the counter on the line 58 will be high for more than half of this period, with the result that the output voltage from the amplifier 66 will decrease, decreasing the current to the drive coil 24 and decelerating the moving mirror 20.

If it is desired to change the velocity of the moving mirror 20, it is simply accomplished under the control of the microprocesser 55 by loading the counter 54 with a different preset maximum count. Increasing the maximum count in the counter will slow the mirror down while decreasing the maximum count in the counter will speed the mirror up. Alternatively, the velocity can be changed by controlling the clock rate of the oscillater 57, with a faster clock rate tending to speed the mirror up and a slower clock rate tending to slow the mirror down.

It is understood that the invention is not confined to the particular construction and arrangement of parts herein illustrated and described, but embraces such modified forms thereof as come within the scope of the following claims.

What is claimed is:

1. Apparatus for use in regulating the velocity of the moving mirror in a Fourier-transform infrared spectrometer of the type which includes an interferometer with a moving mirror driven by a coil, a laser which directs its beam into the interferometer, and a laser detector for detecting the intensity of the laser light exiting from the interferometer, comprising:
   (a) means for detecting the zero crossing of the signal from the laser light detector, for generating a pulse which begins at the time of each zero crossing and lasts for a predetermined period of time and for averaging the pulses to produce an averaged pulse output signal;
   (b) integrating means for summing the averaged pulse signal and a constant bias signal and for integrating the sum to provide an output signal, the value of the bias signal and the predetermined period of time of the pulse from the means for detecting being selected such that the pulse lasts for about half of the time between zero crossings of the laser detector signal during constant velocity and such that the output of the integrating means under such conditions is a substantially constant voltage, and such that the voltage from the integrating means increases as the time between zero crossings of the laser detector signal increases and the voltage from the integrating means decreases as the time between zero crossings of the laser detector output signal decreases;
   (c) means for amplifying the output signal from the integrating means and providing a drive current signal corresponding thereto to the coil driving the moving mirror of the interferometer.

2. The apparatus of claim 1 wherein the means for detecting and providing a pulse signal includes a zero-crossing detector connected to receive the output signal from a laser detector and putting out a square-wave pulse that changes state at each zero crossing, a laser pulse generator which is connected to receive the output of the zero-crossing detector and which provides a pulse output of short duration at each state change cf the signal from the zero-crossing detector, a digitally controlled presetable counter which is loadable with a digital number and which receives the pulse signal from the laser pulse generator as a trigger signal and which receives clock pulses and begins counting the clock pulses at the time that it receives the trigger pulse from the laser pulse generator and stops counting at the time it reaches the presetable count, the presetable counter providing an output signal that goes high at the time it starts and goes low when it reaches the presetable count.

3. The apparatus of claim 2 further including an exclusive-OR gate receiving at one of its inputs the output from the presetable counter and receiving at its other input a signal dictating the direction of motion of the moving mirror.

4. The apparatus of claim 2 further including a low pass filter connected to receive the pulse output signal from the presetable counter to provide an average pulse signal.

5. The apparatus of claim 1 wherein the integrating means further includes an operational amplifier connected to receive at its inverting input the output of the means for detecting and also connected to receive at its inverting input a bias voltage connected to its inverting input through a biasing resistor.

6. Apparatus for use in regulating the velocity of the moving mirror in a Fourier-transform infrared spectrometer of the type which includes an interferometer with a moving mirror driven by a coil, a laser which directs its beam into the interferometer, and a laser detector for detecting the intensity of the laser light exiting from the interferometer, comprising:
   (a) means for detecting the zero-crossings in the signal from the laser detector and for generating a trigger pulse corresponding to the zero-crossings;
   (b) means for generating regular clock pulses;
   (c) counter means receiving the trigger pulses and the clock pulses for counting clock pulses and for providing an output signal which goes high when the trigger pulse is received and goes low at a predetermined time thereafter when the counted clock pulses reach a preset count;
   (d) means for averaging the pulses from the counter means to provide an averaged pulse signal;
   (e) integrating means for receiving and summing the average pulse signal and a constant bias signal and for integrating the summed signals; and
   (f) drive means for providing drive current to the coil for driving the moving mirror in response to the signal from the integrating means.

7. An infrared spectrometer comprising:
   (a) a Michelson interferometer with a moving mirror;
   (b) a positioning laser having a light beam which is directed into the interferometer;
   (c) a laser detector for detecting the intensity of laser light exiting from the interferometer and providing an output signal corresponding thereto;
   (d) an infrared detector for detecting the intensity of infrared exiting from the spectrometer;
   (e) a laser signal zero-crossing detector receiving the output of the laser detector and providing a pulse output which changes state at every zero crossing of the signal;

(f) a trigger pulse generator receiving the output of the zero-crossing detector and providing a trigger pulse at every zero crossing;

(g) counter means receiving the trigger pulses and the clock pulses for counting clock pulses and for providing an output signal which goes high when the trigger pulse is received and goes low at a predetermined time thereafter when the counted clock pulses reach a preset count;

(h) means for averaging the pulses from the counter means to provide an averaged pulse signal;

(i) integrating means for receiving and summing the averaged pulse signal and a constant bias signal and for integrating the summed signals; and (j) drive means for providing current to the coil for driving the motor mirror in response to the signal from the integrating means.

* * * * *